US012781694B2

(12) United States Patent
Grether et al.

(10) Patent No.: US 12,781,694 B2
(45) Date of Patent: Nov. 3, 2026

(54) HANDHELD WORK APPARATUS AND DEFLECTION BOWL FOR ITS COMBUSTION ENGINE

(71) Applicant: Andreas Stihl AG & Co. KG, Waiblingen (DE)

(72) Inventors: Michael Grether, Waiblingen (DE); Andreas Schulz, Erdmannhausen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 4 days.

(21) Appl. No.: 18/486,413

(22) Filed: Oct. 13, 2023

(65) Prior Publication Data

US 2024/0125293 A1 Apr. 18, 2024

(30) Foreign Application Priority Data

Oct. 14, 2022 (DE) ..................... 10 2022 126 966.3

(51) Int. Cl.
*B25F 5/00* (2006.01)
*F02M 35/024* (2006.01)
(Continued)

(52) U.S. Cl.
CPC ......... *F02M 35/02483* (2013.01); *B25F 5/00* (2013.01); *F02M 35/10262* (2013.01); *B27B 17/08* (2013.01)

(58) Field of Classification Search
CPC ....... F02M 35/02483; F02M 35/10262; F02M 35/1017; F02M 35/1019; F02M 35/10006;
(Continued)

(56) References Cited

U.S. PATENT DOCUMENTS 2,012,962 A * 9/1935 Hagar .................... F02M 35/04 96/240
3,241,494 A * 3/1966 Johnson ................... F02M 1/00 261/36.2
(Continued)

FOREIGN PATENT DOCUMENTS

CN 100422542 C * 10/2008 ....... F02M 35/10196
DE 102 11 404 A1 9/2003
(Continued)

*Primary Examiner* — Robert F Long
(74) *Attorney, Agent, or Firm* — Walter Ottesen, P.A.

(57) ABSTRACT

A handheld work apparatus has a combustion engine and a rest position. The engine includes a cylinder wherein a piston is mounted to drive a crankshaft in a crankcase. The engine has an intake channel having an intake channel section formed in a fuel supply. The intake channel is divided into a mixture channel and an air channel. The engine has an air filter defining a clean chamber for a deflection bowl. The deflection bowl has a first passage opening whereat the air channel passes from the deflection bowl into the clean chamber and a second passage opening whereat the mixture channel passes from the deflection bowl into the clean chamber. The air channel and the mixture channel run mutually separate in the deflection bowl. In the rest position, no second passage opening extends into a region situated lower in terms of the geodetic height than the main fuel opening.

15 Claims, 6 Drawing Sheets

(51) Int. Cl.
*F02M 35/10* (2006.01)
*B27B 17/08* (2006.01)

(58) Field of Classification Search
CPC ............... F02M 35/042; F02M 35/044; F02M 35/10091; F02M 35/10295; B25F 5/00; B27B 17/08; F02B 63/02
USPC ........ 173/81, 90, 140–141, 162.1, 197, 198, 173/213, 168–171
See application file for complete search history.

(56) References Cited

U.S. PATENT DOCUMENTS

| | | | | |
|---|---|---|---|---|
| 4,289,094 | A * | 9/1981 | Tanahashi | F02B 25/08 123/73 CC |
| 5,582,146 | A * | 12/1996 | Linsbauer | F02M 35/04 55/486 |
| 6,062,177 | A * | 5/2000 | Becker | F02B 63/02 123/41.63 |
| 6,354,251 | B1 * | 3/2002 | Toda | F02B 25/22 123/73 A |
| 7,025,021 | B1 * | 4/2006 | Andersson | F02B 25/22 123/73 FA |
| 10,954,900 | B2 * | 3/2021 | Martin | F02B 75/02 |
| 2002/0117130 | A1 * | 8/2002 | Toda | F02B 33/04 123/73 A |
| 2002/0139546 | A1 * | 10/2002 | Hezeltine | B25C 1/04 173/1 |
| 2003/0172899 | A1 | 9/2003 | Geyer et al. | |
| 2003/0178211 | A1 * | 9/2003 | Uhl | B23B 45/048 173/48 |
| 2004/0040522 | A1 * | 3/2004 | Mavinahally | F02B 75/16 123/73 V |
| 2004/0090195 | A1 * | 5/2004 | Motsenbocker | B60L 58/25 318/109 |
| 2004/0134175 | A1 * | 7/2004 | Osborne | A01D 69/025 56/10.6 |
| 2004/0168656 | A1 * | 9/2004 | Carlsson | F02M 35/1017 123/73 PP |
| 2005/0004736 | A1 * | 1/2005 | Belcher | B60W 30/146 701/50 |
| 2005/0051118 | A1 * | 3/2005 | Hoche | F02M 35/10255 123/73 A |
| 2005/0247463 | A1 * | 11/2005 | Wuensch | B23Q 11/0046 173/217 |
| 2007/0085496 | A1 * | 4/2007 | Philipp | B01F 35/22161 318/139 |
| 2008/0083199 | A1 * | 4/2008 | Schlauch | B01D 46/24 55/320 |
| 2009/0018745 | A1 * | 1/2009 | Prasetiawan | E02F 9/166 701/99 |
| 2009/0228189 | A1 * | 9/2009 | Zurcher | F02M 35/1019 123/65 R |
| 2011/0284255 | A1 * | 11/2011 | Ookubo | H02P 23/03 173/117 |
| 2012/0193112 | A1 * | 8/2012 | Gwosdz | F02B 63/02 123/339.11 |
| 2012/0312570 | A1 * | 12/2012 | Wanek | B25B 23/147 173/1 |
| 2013/0091816 | A1 | 4/2013 | Yamazaki et al. | |
| 2013/0199812 | A1 * | 8/2013 | Dangelmaier | F02D 31/001 173/179 |
| 2013/0220260 | A1 * | 8/2013 | Ohniwa | F02M 35/02491 123/184.46 |
| 2013/0228152 | A1 * | 9/2013 | Ono | F02D 9/02 123/319 |
| 2013/0291810 | A1 * | 11/2013 | Nishikawa | B23D 59/006 123/2 |
| 2013/0306018 | A1 | 11/2013 | von Krane et al. | |
| 2014/0261277 | A1 * | 9/2014 | Volckart | F02M 35/1017 123/184.21 |
| 2015/0337764 | A1 * | 11/2015 | Yamaguchi | F02M 19/00 261/42 |
| 2016/0376979 | A1 | 12/2016 | Osawa et al. | |
| 2016/0377035 | A1 | 12/2016 | Osawa et al. | |
| 2018/0023515 | A1 * | 1/2018 | Yoneyama | F02M 35/1019 123/590 |
| 2019/0085797 | A1 * | 3/2019 | Wolf | B01D 46/0005 |
| 2020/0248651 | A1 * | 8/2020 | Kobayashi | F02N 19/001 |
| 2023/0116637 | A1 * | 4/2023 | Fenske | F01M 13/0011 55/309 |
| 2023/0128074 | A1 * | 4/2023 | Zheng | B25F 5/001 173/217 |
| 2023/0226679 | A1 * | 7/2023 | Osawa | B27B 17/00 173/199 |
| 2024/0125293 | A1 * | 4/2024 | Grether | F02M 35/1017 |
| 2025/0017429 | A1 * | 1/2025 | Rutschke | A47L 9/0081 |

FOREIGN PATENT DOCUMENTS

| | | | | | |
|---|---|---|---|---|---|
| DE | 103 41 230 | A1 | | 3/2005 | |
| DE | 10 2006 047 451 | A1 | | 4/2008 | |
| DE | 10 2012 010 584 | A1 | | 11/2013 | |
| EP | 2 581 595 | A1 | | 4/2013 | |
| EP | 3 115 572 | A1 | | 1/2017 | |
| EP | 3 115 573 | A1 | | 1/2017 | |
| JP | 2009185633 | A | * | 8/2009 | F02B 25/22 |
| JP | 6556524 | A | | 1/2017 | |
| JP | 2021187061 | A | * | 12/2021 | |

* cited by examiner

HANDHELD WORK APPARATUS AND DEFLECTION BOWL FOR ITS COMBUSTION ENGINE

CROSS-REFERENCE TO RELATED APPLICATIONS

This application claims priority of German patent application no. 10 2022 126 966.3, filed Oct. 14, 2022, the entire content of which is incorporated herein by reference.

TECHNICAL FIELD

The disclosure relates to a handheld work apparatus having a combustion engine for driving a work tool. The work apparatus has a rest position wherein the work apparatus stands on a planar, horizontal rest surface. The disclosure also relates to a deflection bowl for the combustion engine of a handheld work apparatus.

BACKGROUND

From US 2008/0083199 there is known a handheld work apparatus having a combustion engine, the intake channel of which is divided by a partition wall into a mixture channel and an air channel. In the fuel supply unit, the mixture channel is situated in the rest position of the work apparatus above the air channel. Therefore, the run of the channel from the fuel supply unit to the combustion engine is relatively cumbersome. Moreover, it has been found that the retaining walls specified in US 2008/0083199, which are supposed to prevent fuel from getting into the clean chamber of the air filter from the deflection bowl, are fluidically unfavorable.

The disclosure is based on the problem of providing a handheld work apparatus having a compact configuration and a favorable running behavior of the combustion engine.

It has been found that fuel can collect at the upper retaining walls in the prior art, which can then drip down and gush into the combustion engine. This can result in uneven running of the combustion engine. In order to prevent this uneven running of the combustion engine, it is proposed according to the disclosure that the mixture channel in the rest position runs at least partly beneath the air channel at least in the fuel supply unit. In this way, the mixture channel can emerge at the deflection bowl at least partly beneath the air channel. The second passage openings at which the mixture channel passes from the deflection bowl into the clean chamber are arranged however, according to the disclosure, such that, in the rest position, no second passage opening extends into a region which is situated lower in terms of the geodetic height than the main fuel opening. Because the mixture channel in the rest position runs at least partly beneath the air channel at least in the fuel supply unit, a complete reconfiguration of the deflection bowl is required as compared to the configuration provided in US 2008/0083199. Because the mixture channel in the rest position runs at least partly beneath the air channel at least in the fuel supply unit and, in the rest position, no second passage opening extends into a region which is situated lower in terms of the geodetic height than the main fuel opening, the mixture channel in the deflection bowl must be moved upward in relation to the rest position. This can prevent fuel from the main fuel opening getting into the clean chamber of the air filter due to back pulsations during operation.

Especially preferably, the deflection bowl can be configured such that, in the rest position, no second passage opening extends into a region which is situated lower in terms of the geodetic height than the partition wall in the upstream located end face of the fuel supply unit. In this way, a passage of fuel from the mixture channel into the clean chamber of the air filter can advantageously be largely prevented.

In order to realize sufficiently large flow cross sections and low flow resistances in the deflection bowl despite the cramped force conditions in the clean chamber of the air filter configured as a round filter, there are advantageously two second passage openings and the mixture channel is divided into two arms in the deflection bowl, each of them emerging at a passage opening. The two second passage openings are especially preferably arranged on both sides of a central plane of the combustion engine, the central plane of the combustion engine containing a cylinder longitudinal axis. This produces an advantageous streamlined and space-saving arrangement. However, a different arrangement of the two second passage openings can be advantageous.

The connecting opening of the mixture channel into the deflection bowl lies advantageously entirely overlapping with the deflection bowl, looking in the direction of an intake channel longitudinal axis. This advantageously prevents a spitting back of fuel from the mixture channel into the clean chamber of the air filter. Fuel spat back is advantageously caught by the deflection bowl before it can get into the clean chamber of the air filter. Especially preferably, the entire connecting opening of the intake channel into the deflection bowl lies entirely overlapping with the deflection bowl, looking in the direction of an intake channel longitudinal axis. Fuel which has gotten into the air channel can also be caught in this way by the deflection bowl.

In order to make possible an easy manufacturing and stripping of the deflection bowl from the mold, especially in the case of manufacture as an injection molded piece, it is advantageously provided that the deflection bowl includes a first deflection bowl part and a second deflection bowl part, bounding the mixture channel. Accordingly, the deflection bowl is formed in at least two pieces, at least in the section bounding the mixture channel. In order to ensure a good tightness of the deflection bowl in the section bounding the mixture channel in an easy manner, it is proposed that the first deflection bowl part and the second deflection bowl part overlap at least on a deflection bowl base of the deflection bowl, bounding the deflection bowl at the bottom in the rest position, in the radial direction of the intake channel longitudinal axis. The first deflection bowl part and the second deflection bowl part can advantageously lie against each other and thus ensure a long sealing surface and a labyrinth-type sealing. This ensures an easy manufacturing and good tightness. The interposition of a separate seal or the joining of the deflection bowl parts by means of a sealing compound are advantageously unnecessary, thanks to the overlapping. Especially preferably, the seal gap has a stepped shape.

In order to ensure a good separation of the air channel and the mixture channel and at the same time sufficiently long channel lengths, it is advantageously provided that the partition wall extends into the deflection bowl. A simple configuration is achieved when a section of the partition wall is formed on the deflection bowl. The section of the partition wall formed on the deflection bowl can protrude into the fuel supply unit, for example as far as a choke shaft with which a choke element is mounted, or, if no choke element is present, as far as a throttle shaft with which a throttle element of the fuel supply unit is mounted.

Advantageously, the partition wall adjoins a rear wall of the deflection bowl. The rear wall of the deflection bowl advantageously makes an angle of 100° to 170°, especially 110° to 160°, with a central plane of the partition wall. Fuel collecting at the rear wall of the deflection bowl can thus be entrained easily by the incoming air during the next intake process and be transported back to the combustion engine.

Fuel supply units are usually screwed tight by means of fastening screws to frames or directly to the cylinder or to the crankcase of the combustion engine. The fastening screws are advantageously accessible when the air filter is removed, without the deflection bowl having to be dismounted. In order to achieve a favorable arrangement despite the limited space conditions, it is advantageously provided that the deflection bowl includes two fastening openings for fastening screws. The fastening screws are preferably fastening screws for the fixing of the fuel supply unit. Especially advantageously, the fuel supply unit is mounted via the deflection bowl on a housing of the work apparatus. For this, the deflection bowl advantageously includes at least one bearing element, for example at least one bearing support.

Advantageously, one of the fastening openings is situated above and one of the fastening openings is situated below the central plane of the partition wall in the rest position. Accordingly, the fastening openings extend on opposite sides of the partition wall. This makes possible a compact arrangement of the fastening screws.

Advantageously, the mixture channel in the deflection bowl is divided into two arms, between which a partition wall runs. Preferably, the partition wall adjoins the partition wall between the two fastening openings on the partition wall. This provides a compact configuration. The partition wall advantageously makes an angle of less than 80° with the central plane of the partition wall. Accordingly, the partition wall does not run perpendicular to the central plane of the partition wall. Thus, a sufficiently large flow cross section can be realized for both arms even when the fastening openings are arranged asymmetrically with respect to the arms.

Advantageously, at least one fastening opening is formed on a screw eyelet which is adjoined by a sleeve. At least one section of the sleeve is advantageously cut out for the passage of the mixture channel. This also makes possible a sufficiently large flow cross section for the mixture channel.

Advantageously, a cover is arranged in the deflection bowl at least at one passage opening, partly covering the passage opening in the upward direction in the rest position. It has been found that fuel can collect at the bottom of the deflection bowl. When the work apparatus is swung, this fuel can get into the clean chamber of the air channel through the passage opening. This is prevented by the cover. The cover is preferably arranged at least at the lower lying passage opening in the rest position. Preferably, the cover adjoins the rear wall of the deflection bowl. It has been found that mixture can accumulate especially in this region of the deflection bowl. However, it can also be provided to have corresponding covers at both passage openings.

The combustion engine is advantageously a two-stroke motor having at least one transfer channel, which connects a crankcase interior of the crankcase in the region of the bottom dead center of the piston fluidically to the combustion chamber. The air channel is advantageously connected fluidically to the transfer channel for at least a portion of a stroke of the piston. The stroke of the piston is the travel of the piston between its top dead center and its bottom dead center.

The disclosure furthermore relates to a deflection bowl for arrangement in the clean chamber of the air filter of the combustion engine of a handheld work apparatus.

In the deflection bowl there are advantageously situated a section of a mixture channel and a section of an air channel of the combustion engine. The deflection bowl includes advantageously a first and a second deflection bowl part, bounding the section of the mixture channel. The first and the second deflection bowl part overlap preferably at least on a deflection bowl base of the deflection bowl in the radial direction of a central axis of the deflection bowl. The central axis of the deflection bowl is preferably configured to be arranged in overlap with an intake channel longitudinal axis of the combustion engine. Advantageously, a section of a partition wall of the intake channel of the combustion engine is formed on the deflection bowl. The section of the partition wall preferably adjoins a rear wall of the deflection bowl, making an angle of 100° to 170°, especially 110° to 160°, with a central plane of the section of the partition wall. A partition wall, extending between two arms of the section of the mixture channel situated in the deflection bowl, preferably adjoins the section of the partition wall in the deflection bowl between two fastening openings of the deflection bowl.

Advantageously, a cover is arranged in the deflection bowl at least at one passage opening, at least partly covering the passage opening.

BRIEF DESCRIPTION OF DRAWINGS

The invention will now be described with reference to the drawings wherein.

DETAILED DESCRIPTION

Figure 1:
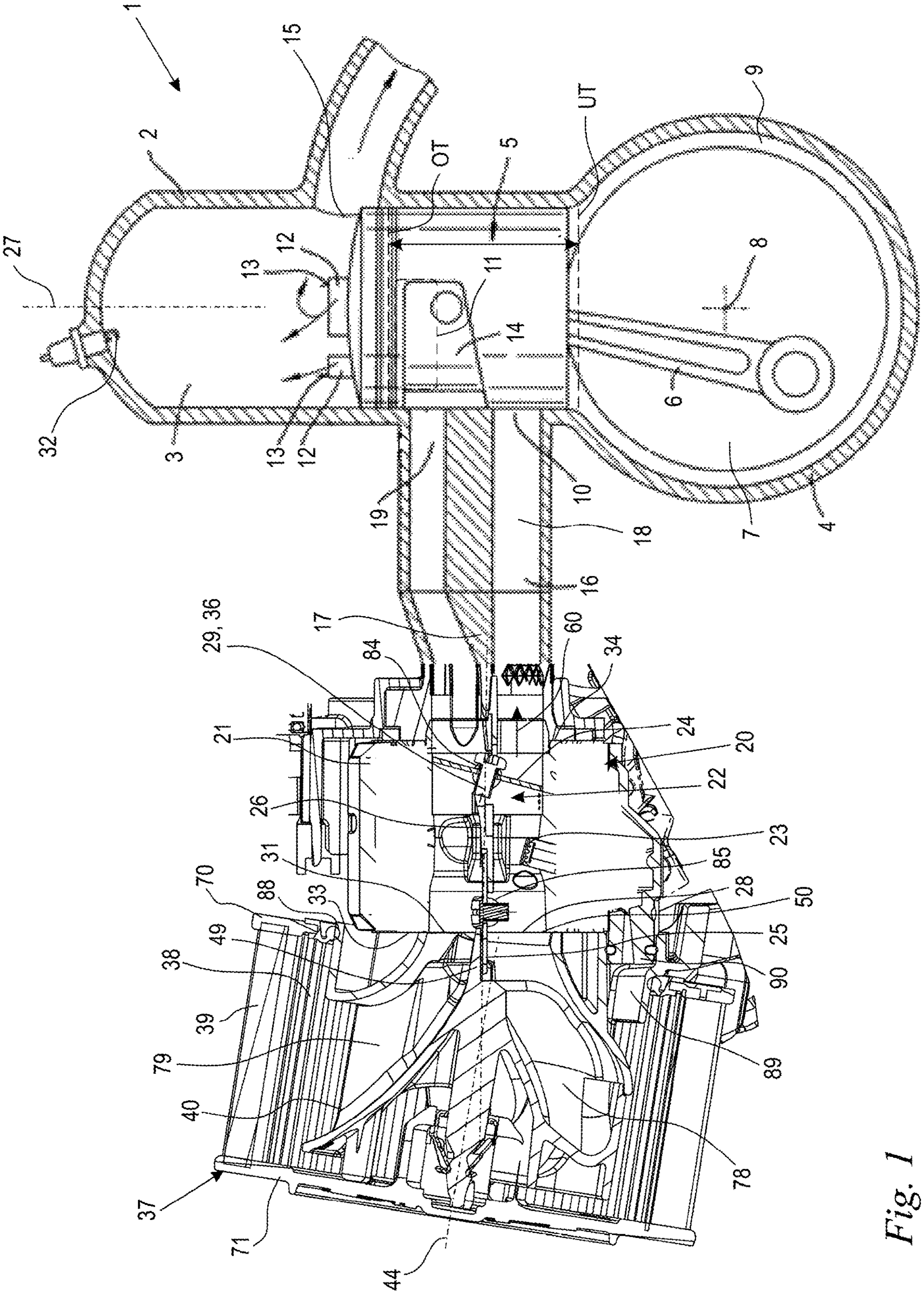
FIG. 1 is a schematic cross-sectional representation of a combustion engine.

FIG. 1 shows a combustion engine 1 in schematic longitudinal cross section. In the embodiment, the combustion engine 1 is a two-stroke motor. However, the combustion engine 1 can also be a four-stroke motor, especially a mixture-lubricated four-stroke motor. The combustion engine 1 is advantageously a single-cylinder motor. The two-stroke motor shown in FIG. 1 stands as an example for a combustion engine 1, especially for a two-stroke motor working with a stratified scavenging, and it can have any other conventional layout of such a motor in regard to the elements situated downstream from a fuel supply unit 20, to be described in more detail in the following.

The combustion engine 1 includes a cylinder 2, in which a combustion chamber 3 is formed. In the cylinder 2, a piston 5 is mounted in a reciprocating manner between a bottom dead center BDC and a top dead center TDC. In FIG.

1, the position of the lower edge of the piston 5 in the bottom dead center is designated as BDC and the position of the lower edge of the piston 5 in the top dead center is designated as TDC. Between the bottom dead center BDC and the top dead center TDC the piston 5 executes a stroke h in the direction of a cylinder longitudinal axis 27 of the cylinder 2.

The combustion engine 1 includes a crankcase 4, in which a crankcase interior 9 is formed. In the crankcase 4, a crankshaft 7 is mounted rotatably about a rotational axis 8. The piston 5 drives the crankshaft 7 via a connecting rod 6 in rotation about the rotational axis 8. The crankcase interior 9 and the combustion chamber 3 are connected to the combustion chamber 3 in the region of the bottom dead center BDC of the piston 5 by transfer channels 12. The transfer channels 12 emerge by transfer windows 13 in the combustion chamber 3. The transfer windows 13 are controlled by the piston 5. An air channel 19 having at least one air inlet 11 emerges at the cylinder 2. A mixture channel 18 emerges by a mixture inlet 10 at the cylinder 2. An outlet 15 leads out from the combustion chamber 3. The outlet 15, the mixture inlet 10, and the air inlet 11 are controlled by the piston 5. The piston 5 includes one or more piston pockets 14. The piston pocket 14 connects the air inlet 19 to the transfer windows 13 in the region of the top dead center TDC of the piston 5. The representation in FIG. 1 is schematic, and therefore the position of the air inlet 11 and the piston pocket 14 as well as the position of the other openings do not conform to the actual arrangement.

The combustion engine 1 during operation draws air in through an intake channel 16. The intake channel 16 is divided by a partition wall 17 into the air channel 19 and the mixture channel 18. One section of the intake channel 16 is formed in the fuel supply unit 20. In the embodiment, the fuel supply unit 20 is a carburetor. However, a different kind of fuel supply unit, such as a fuel valve, can be advantageous. In the intake channel 16, in the embodiment in the fuel supply unit 20, there is pivot-mounted a throttle element 24 for controlling the free flow cross section of the intake channel 16. For this, the throttle element 24 has a throttle shaft 84. In the embodiment, upstream from the throttle element 24 there is arranged a choke element 25. The choke element 25 can likewise be pivot-mounted in the intake channel 16. In the embodiment, the choke element 25 is pivot-mounted with a choke shaft 85.

The fuel supply unit 20 includes a base body 21, in which an intake channel section 22 of the intake channel 16 is formed. In the embodiment, a partition wall section 26 extends between the choke shaft 85 and the throttle shaft 84. The partition wall section 26 can be formed on the base body 21 or it can be held on the latter. A section 49 of the partition wall 17 extends upstream from the choke shaft 85. The section 49 of the partition wall 17 in the embodiment is formed on a deflection bowl 40. In the deflection bowl 40, a section 78 of the mixture channel and a section 79 of the air channel are situated. The sections 78 and 79 run entirely separate from each other in the deflection bowl 40.

The terms “upstream” and “downstream” in the present instance refer to a flow direction 60 in the intake channel directed from the fuel supply unit 20 to the cylinder 2 or to the crankcase 4 of the combustion engine 1.

Upstream from the fuel supply unit 20 there is arranged an air filter 37, by which the combustion engine 1 draws in combustion air. The air filter 37 includes filter material 39 which separates a clean chamber 38 of the air filter 37 from the surroundings. The air filter 37 is configured as a round filter and it includes a base plate 70 as well as a cover plate 71. The base plate 70 and the cover plate 71 advantageously run parallel to each other. The filter material 39 extends between the base plate 70 and the cover plate 71, being formed preferably of plastic such as PET and being arranged folded in particular. The deflection bowl 40 is surrounded by the filter material 39. The deflection bowl 40 adjoins the base plate 70. In the embodiment, the deflection bowl 40 is arranged tightly in an opening 88 (also see FIG. 7) of the base plate 70. The air filter 37 has a central axis 44. The central axis 44 runs preferably perpendicular to the base plate 70 and to the cover plate 71 and parallel to the filter material 39. The filter material in the embodiment extends in a folded manner in an annular space around the central axis 44. In the embodiment, the annular space is circular. However, the annular space can also have a different shape in cross section, for example, an ellipse. A round filter means in the present case that the filter material runs between end-face plates and completely encloses the clean chamber. The sections 78 and 79 emerge separately from each other in the clean chamber 38 of the air filter 37.

The fuel supply unit 20 includes a main fuel opening 23, through which mixture is drawn into the mixture channel 18 during operation. Further fuel openings may be present, in particular idling fuel openings and/or partial load fuel openings. The main fuel opening 23 emerges upstream from the throttle shaft 84 in the mixture channel 18. Because of pulsations in the intake channel 16, mixture can flow contrary to the flow direction 60 toward the deflection bowl 40 during operation. The deflection bowl 40 is configured to prevent fuel from getting into the clean chamber 38 of the air filter 37 and fouling the filter material 39. The configuration of the deflection bowl 40 provided for this shall be described in more detail in the following.

The intake channel 16 has an intake channel longitudinal axis 29. The main fuel opening 23 emerges in the region of a Venturi section 30 in the mixture channel 18. The partition wall 17 has a central plane 36, containing the intake channel longitudinal axis 29.

The fuel supply unit 20 has an upstream situated end face 33 and a downstream situated end face 34. At the upstream situated end face 33, the fuel supply unit 20 has a connecting opening 28, at which the mixture channel 18 stands in communication with the section 78 of the mixture channel 18 formed in the deflection bowl. The upstream situated end face 33 of the fuel supply unit 20 furthermore has a connecting opening 31, at which the section 79 of the air channel 19 formed in the deflection bowl passes into the section of the air channel 19 formed in the fuel supply unit 20. The connecting openings 28 and 31 form a connecting opening 50 at the end face 33, where the intake channel 16 passes from the deflection bowl 40 into the fuel supply unit 20. At the end face 33, the section 49 of the partition wall 17 protrudes into the connecting opening 50 and divides this into the connecting openings 28 and 31.

At the upstream situated end face 33, the fuel supply unit 20 includes a compensation connection 90, by which the pressure from the clean chamber 38 of the air filter 37 is provided as a reference pressure. This is provided in particular when the fuel supply unit 20 is configured as a membrane carburetor. The deflection bowl 40 has an opening 89 to the clean chamber 38 of the air filter 37, to which the compensation connection 90 is attached.

In operation, the combustion engine 1 during the upward stroke of the piston 5 draws the fuel/air mixture from the mixture channel 18 into the crankcase interior 9. Once the air inlet 11 is connected via the piston pocket 14 to transfer windows 13, air is drawn from the air channel 19 through the piston pocket 14 into the transfer channels 12, and this is because of the partial vacuum prevailing in the crankcase interior 9. Fuel/air mixture from the previous motor cycle which is still present in the transfer channels 12 is displaced in the direction of the crankcase interior 9. During the downward stroke of the piston 5, at first the outlet 15 is opened and exhaust gases from the previous motor cycle flow out. After this, air from the transfer channels 12 flows via the transfer window 13 into the combustion chamber 3 and purges exhaust gases which are still present from the previous motor cycle in the combustion chamber 3, through the outlet 15. Next, fresh fuel/air mixture from the crankcase interior 9 flows via the transfer channels 12 into the combustion chamber 3. During the upward stroke of the piston 5, the mixture in the combustion chamber 3 is compressed and ignited in the usual manner in the region of the top dead center TDC of the piston 5 by a spark plug 32 protruding into the combustion chamber 3. In the subsequent combustion, the piston 5 is accelerated in the direction of the crankcase 4. Once the outlet 15 opens, the exhaust gases flow out from the combustion chamber 3 and stratified scavenging air and fresh fuel/air mixture for the following motor cycle flow into the combustion chamber 3.

Figure 2:
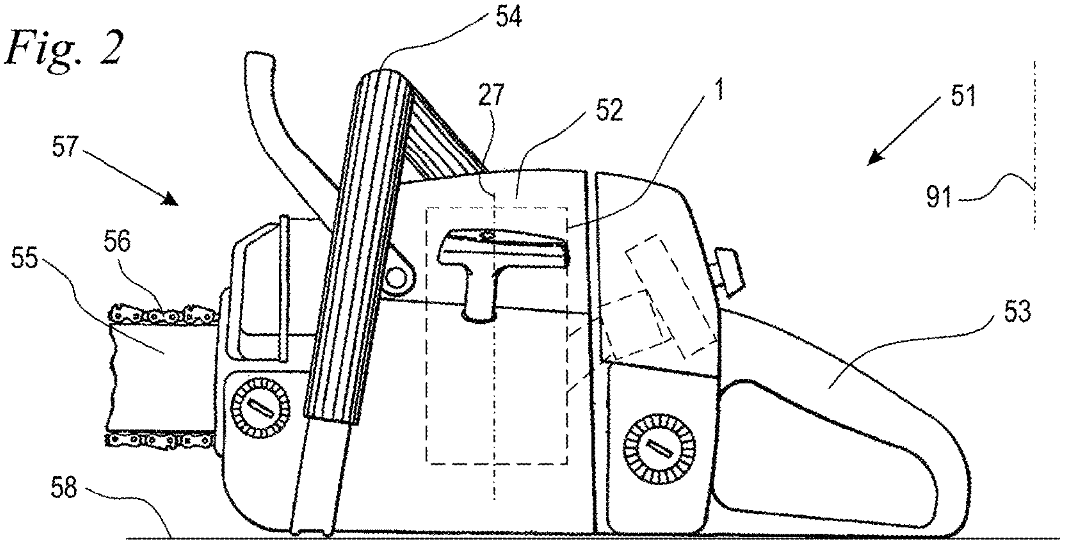
FIG. 2 is a schematic representation of a handheld work apparatus.

FIG. 2 shows schematically a work apparatus 51, in which the combustion engine 1 can be used advantageously. In FIG. 2, a chain saw is shown as an embodiment of a work apparatus 51. However, the combustion engine 1 can also find use in other handheld work apparatus such as cutting grinders, brushcutters, blowers, lawn mowers or the like.

The work apparatus 51 includes a housing 52, on which a rear handle 53 and a bale handle 54 are fastened, preferably via antivibration elements. The work apparatus 51 can be guided by the user during operation by means of the handle 53 and the bale handle 54.

FIG. 2 shows the work apparatus 51 in a rest position 57, in which the work apparatus 51 stands on a horizontal, level rest surface 58. In this position, the cylinder longitudinal axis 27 runs perpendicular to the rest surface 58 in the embodiment. However, it can also be provided that the cylinder longitudinal axis 27 is tilted in relation to the rest surface 58. The work apparatus 51 in the embodiment includes a saw chain 56 as the tool, which is driven in circulation on a guide bar 55 by the combustion engine 1.

Figure 3:
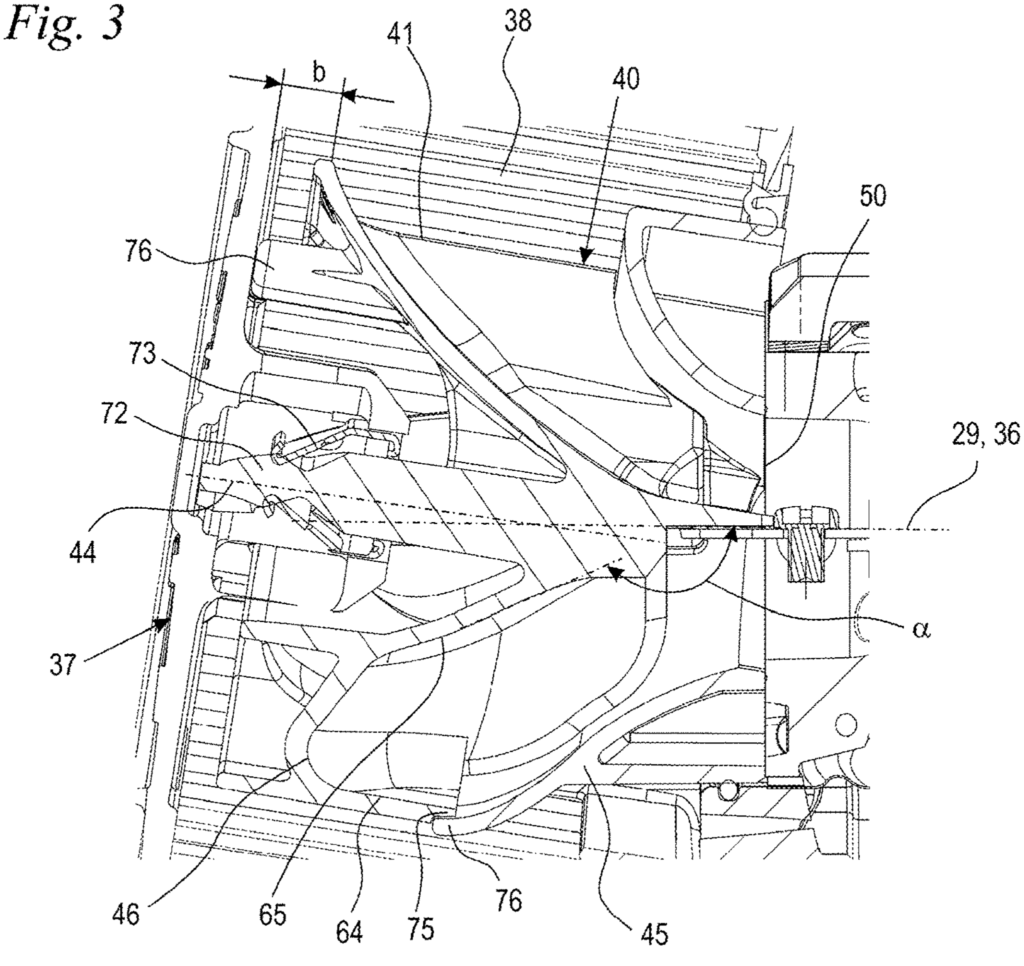
FIG. 3 is a partly enlarged representation of the deflection bowl of FIG. 1.
Figure 4:
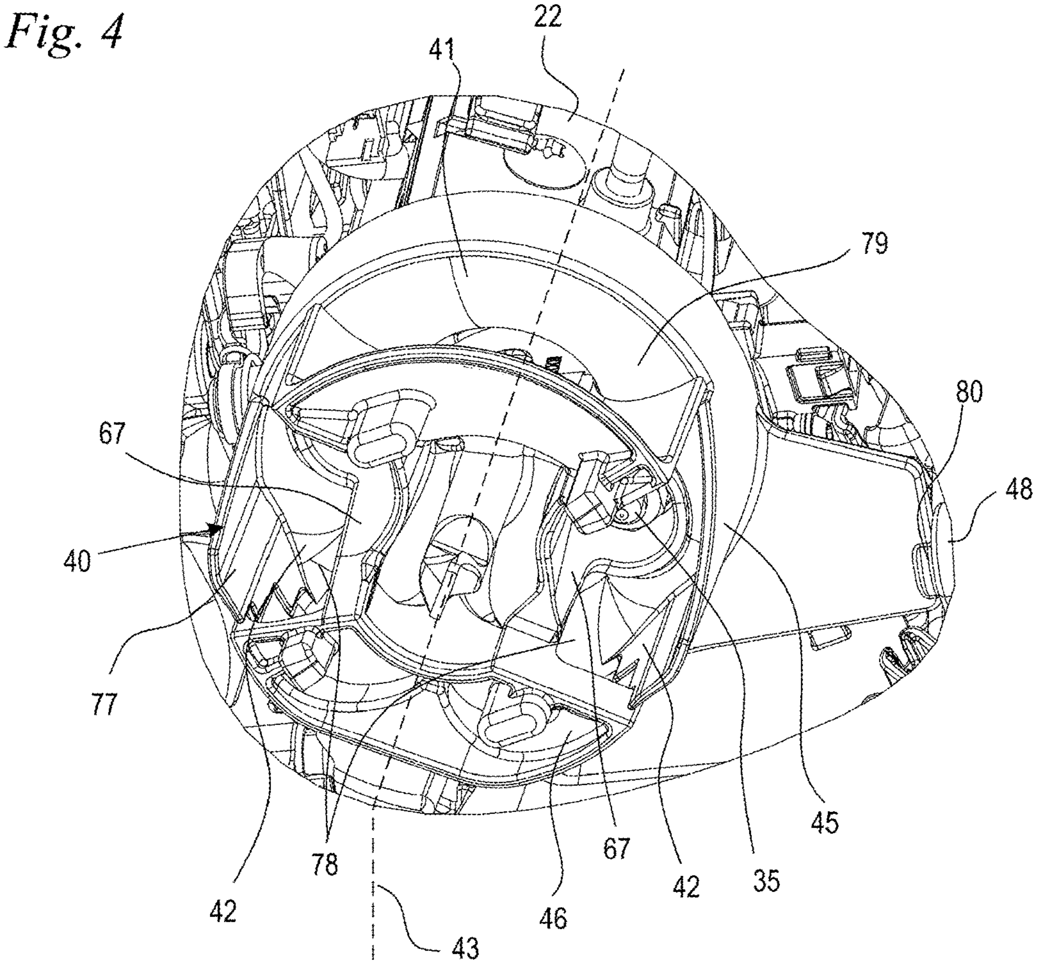
FIG. 4 shows a perspective representation of the deflection bowl of the work apparatus at the fuel supply unit.
Figure 5:
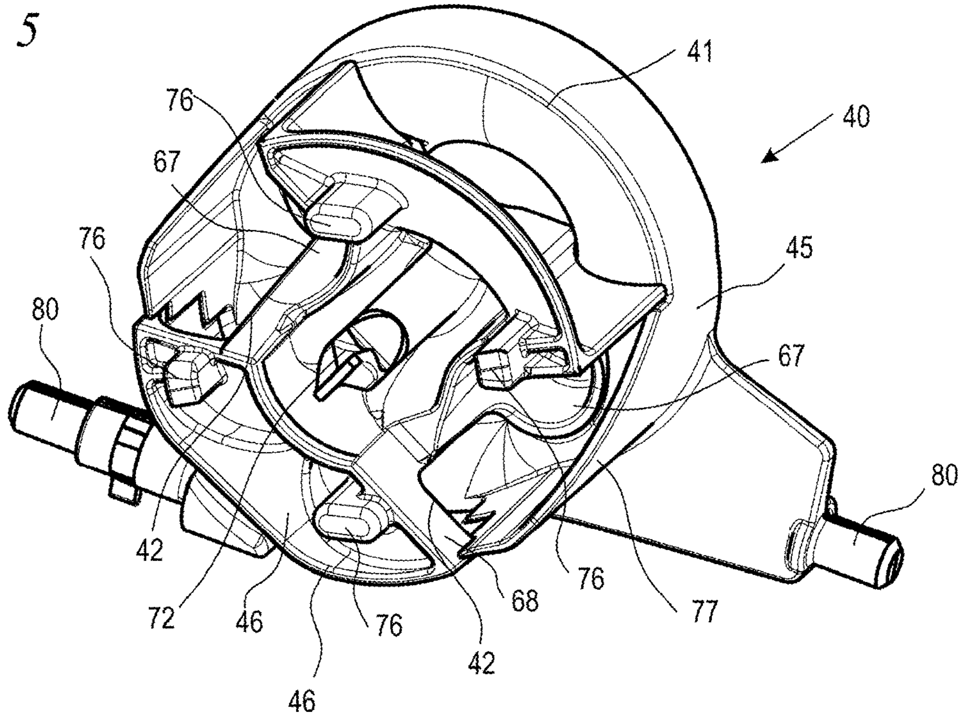
FIG. 5 shows a further perspective representation of the deflection bowl.

FIGS. 3 to 5 show the configuration of the deflection bowl 40 in detail. In the embodiment, the deflection bowl 40 is two-piece and includes a first deflection bowl part 45 and a second deflection bowl part 46. The multi-piece configuration of the deflection bowl 40 enables a simple manufacture of the deflection bowl 40 in an injection molding process. The deflection bowl 40 can also be formed by more than two deflection bowl parts.

Advantageously, the passage openings 41 and 42 of the deflection bowl 40 have a spacing b from the cover plate 71, as shown in FIG. 3 for the passage opening 41. The spacing b is measured parallel to the central axis 44 of the air filter 37. The air filter 37 is preferably secured to the deflection bowl 40 with a quick release fastener. In the embodiment, the deflection bowl 40 includes a fastening support 72, which is engaged by a fastening clamp 73 of the air filter 37 and secures the air filter 37 in the direction of its central axis 44. The deflection bowl 40 includes abutment stubs 76 (see also FIGS. 4 and 5). The cover plate 71 in the mounted state lies against the abutment stubs 76, as shown by FIG. 3. The abutment stubs 76 form an abutment, so that the air filter 37 is mounted free of play on the fastening support 72.

Figure 12:
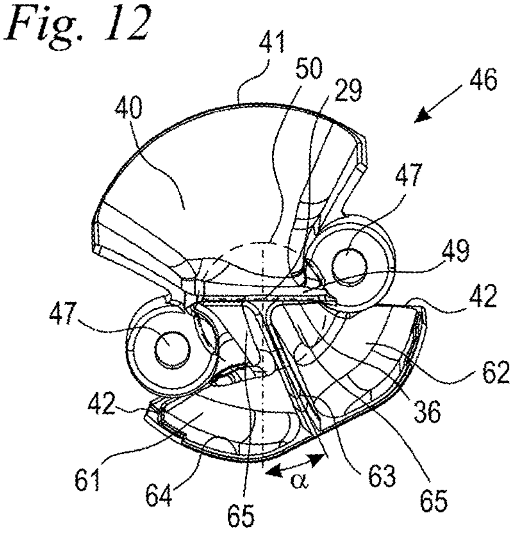
Figure 13:
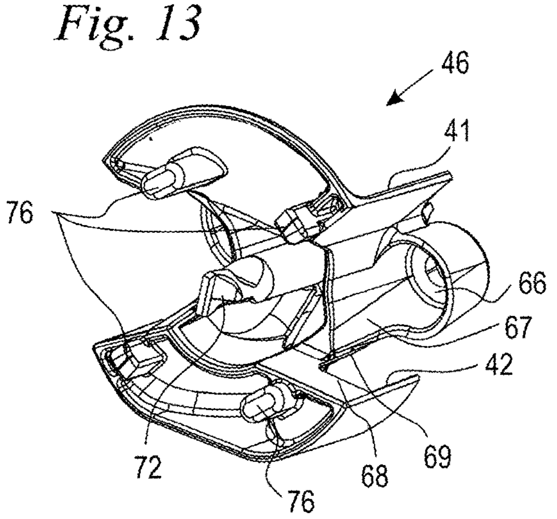
Figure 14:
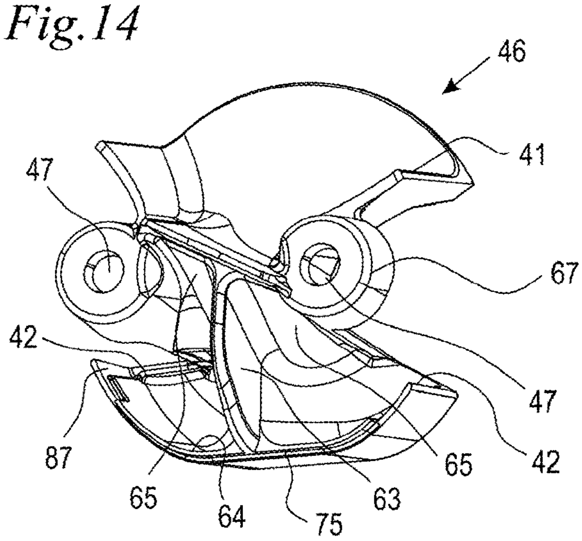
Figure 16:
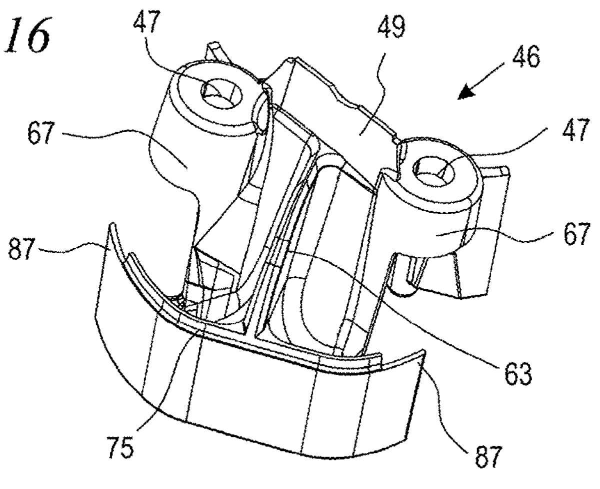

As shown by FIG. 3, the partition wall 17 in the deflection bowl 40 adjoins a rear wall 65 of the deflection bowl 40. The rear wall 65 is arranged between the connecting opening 50 and the cover plate 71 of the air filter 37 (FIG. 5). The rear wall 65 makes an angle $\alpha$ with the central plane 36 of the partition wall 17. The angle $\alpha$ is advantageously from 100° to 170°. An angle $\alpha$ of 110° to 160° is seen as being especially advantageous. In the rest position 57, the rear wall 65 is therefore configured as a kind of sloping roof. Fuel collecting on the rear wall 65 can be entrained by incoming air. The rear wall 65 is also represented in FIGS. 12, 14 and 16. In the cross-sectional representations from FIG. 1 and FIG. 3, the central plane 36 of the partition wall 17 coincides with the intake channel longitudinal axis 29 of the fuel supply unit 20.

As FIG. 3 also shows, a web 75 runs on the second deflection bowl part 46. The web 75 extends at least into the region of the deflection bowl 40 forming a deflection bowl base 64. The deflection bowl base 64 is the region of the deflection bowl 40 which forms the bottom of the section 78 of the mixture channel 18 in the rest position 57. The web 75 engages with the first deflection bowl part 45, so that the two deflection bowl parts 45 and 46 overlap in the region of the deflection bowl base in the radial direction to the intake channel longitudinal axis 29 and in the radial direction to the central axis 44 of the air filter 37. For this, the first deflection bowl part 45 has a web 74 which reaches across the web 75.

FIG. 4 shows one of two fastening screws 35 by which the fuel supply unit 20 is fastened on the deflection bowl 40 or on a connection component, such as a connection flange or the cylinder 2 of the combustion engine 1. The deflection bowl 40 includes sleeve-shaped sections 67 through which the fastening screws 35 are accessible. As shown by FIG. 4, the sleeve-shaped sections 67 are cut out in the region of the passage openings 42.

The section 79 of the air channel 19 emerges, as shown by FIG. 4, by a passage opening 41 of the deflection bowl 40 in the clean chamber 38 (FIG. 3) of the air filter 37. The section 78 of the mixture channel 18 emerges by two passage openings 42 of the deflection bowl 40 in the clean chamber 38 of the air filter 37 (FIG. 3). The two second passage openings 42 are arranged on both sides of a central plane 43 of the combustion engine 1. The central plane 43 contains the cylinder longitudinal axis 27 (FIG. 1 and FIG. 2) and the intake channel longitudinal axis 29 (FIG. 1). The central plane 43 of the combustion engine 1 corresponds to the sectional plane of FIG. 1 and FIG. 3.

As shown by FIG. 4, the deflection bowl 40, being in the embodiment the first deflection bowl part 45, includes two bearing supports 80. With the bearing supports 80, the deflection bowl 40 is mounted together with the air filter 37 in a vibration dampening manner with respect to the housing 52 of the work apparatus 51 (FIG. 2). In the embodiment, the bearing supports 80 are arranged in housing receptacles 48 for this purpose. It can be provided that the fuel supply unit 20 is itself connected to the deflection bowl 40 and is likewise mounted via the bearing supports 80. The connection of the fuel supply unit 20 to the cylinder 2 in this case is advantageously formed by an elastic connection stub.

As shown by FIGS. 4 and 5, the deflection bowl 40 includes a circumferential wall 77, which is formed partly by the first deflection bowl part 45 and partly by the second deflection bowl part 46. The first deflection bowl part 45 and the second deflection bowl part 46 overlap on the circumferential wall 77. The overlapping of the deflection bowl parts 45 and 46 on the deflection bowl base 64 is shown in FIG. 3. In FIG. 4, the position of the central plane 43 of the combustion engine 1 is also shown.

FIG. 5 shows a cover 68 on one of the second passage openings 42. As shown by FIG. 4, the cover 68 is arranged on the second passage opening 42, which lies lower in the rest position 57 than the other passage opening 42. The cover 68 closes a portion of the second passage opening 42 on the side of the passage opening 42 facing away from the fuel supply unit 20 (FIG. 1).

Figure 6:
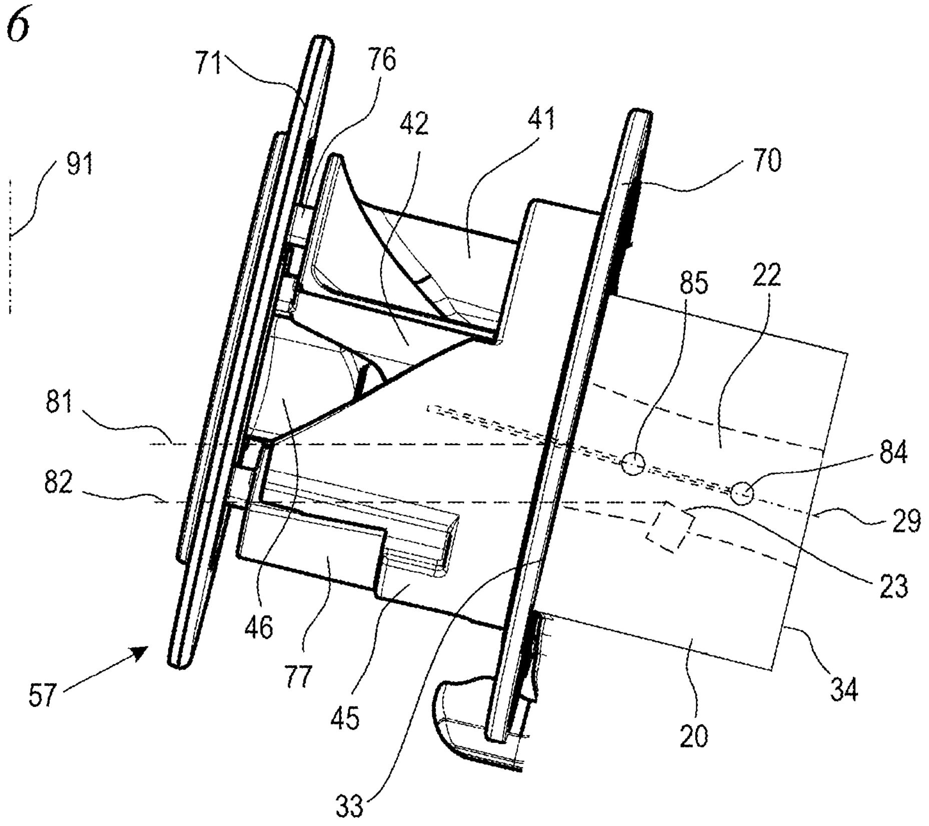
FIG. 6 is a schematic side view of the deflection bowl at the fuel supply unit.

FIG. 6 shows schematically the position of the passage openings 42 and 41 in the rest position 57 with respect to the geodetic height of the main fuel opening 23 and with respect to the geodetic height of the partition wall 17 in the upstream situated end face 33 of the fuel supply unit 20. The geodetic height in the rest position 57 is determined relative to a perpendicular axis 91 to the rest surface, which is shown as a dashed line in FIGS. 2 and 6. The geodetic height of the main fuel opening 23 is illustrated schematically in FIG. 5 by a line 82. A line 81 characterizes the geodetic height of the partition wall 17 in the upstream situated end face 33 of the fuel supply unit 20. The fuel supply unit 20 is represented merely schematically in FIG. 5. As shown by FIG. 6, no second passage opening 42 extends into the region beneath the line 82. The visible passage opening 42 extends to slightly above the line 81. The other passage opening 42 lies further upward, as shown by a comparison with FIG. 5, in the rest position 57. Accordingly, neither does any second passage opening 42 extend into a region situated lower than the partition wall 17 in the upstream situated end face 33 of the fuel supply unit 20, in regard to the geodetic height.

Figure 7:
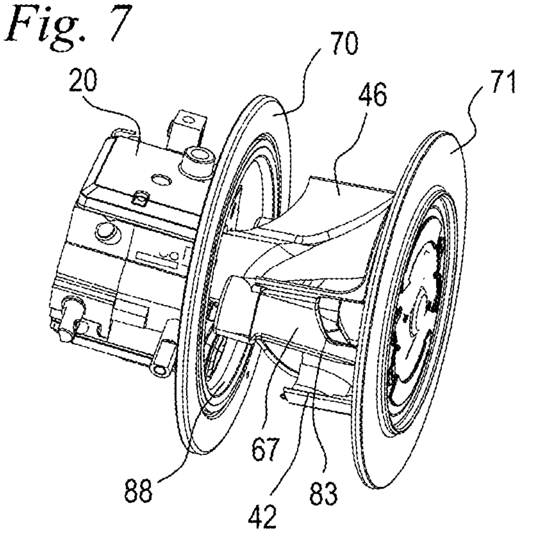
FIG. 7 and FIG. 8 show perspective exploded representations of a deflection bowl part at the fuel supply unit.
Figure 8:
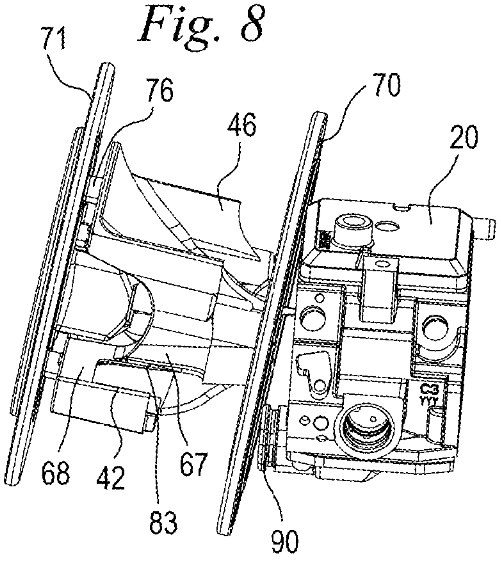

FIGS. 7 and 8 show the fuel supply unit 20, the base plate 70 and the cover plate 71 of the air filter 37 as well as the second deflection bowl part 46. The filter material 39 and the first deflection bowl part 45 are not represented. In FIGS. 6 and 7, each time one of the sleeve-shaped sections 67 and a cutout 83 for the passage opening 42 of the mixture channel formed each time on the sleeve-shaped sections 67 are represented. The cutouts 83 make possible a sufficiently large flow cross section for the passage openings 42 in a compact arrangement. FIG. 8 also represents the compensation connection 90 of the fuel supply unit 20.

Figure 9:
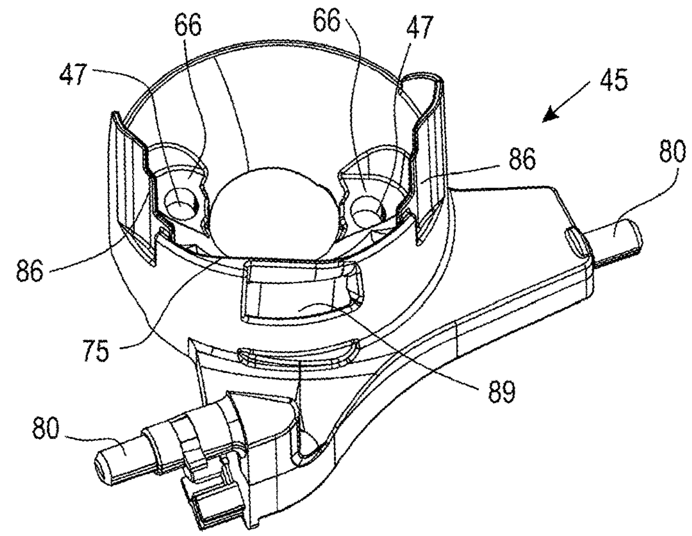
FIG. 9 is a perspective representation of a first deflection bowl part.

FIG. 9 shows the first deflection bowl part 45. As shown by FIG. 9, the first deflection bowl part 45 includes two screw eyelets 66, on each of which a fastening opening 47 is formed. A fastening screw 35 (FIG. 4) protrudes through each fastening opening 47. As FIG. 9 shows, the opening 89 for the compensation connection 90 is formed on the first deflection bowl part 45. The circumferential wall 77 has sections 86 of reduced thickness, the outsides of which are provided to bear against the second deflection bowl part 46.

Figure 10:
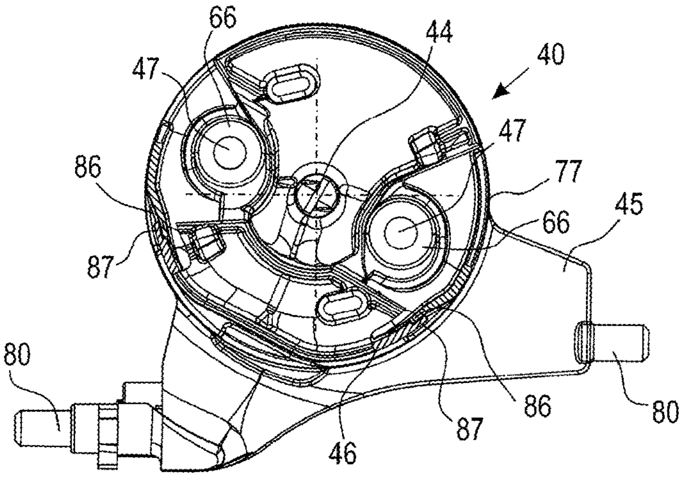
FIG. 10 and FIG. 11 show cross-sectional representations through the first deflection bowl part; and, FIG. 12 to FIG. 16 show perspective representations of the second deflection bowl part.
Figure 15:
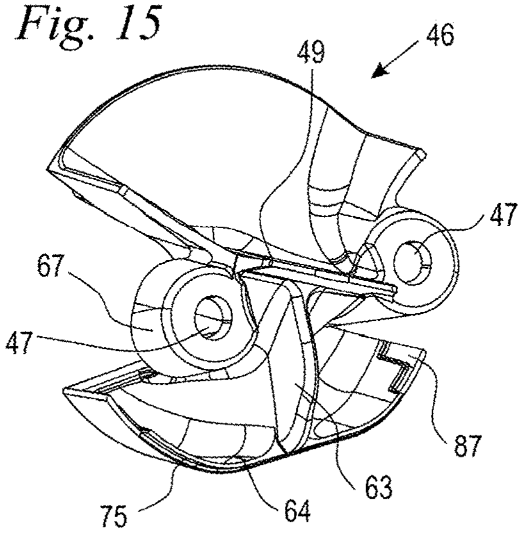

FIG. 10 shows both deflection bowl parts 45 and 46 in cross section. The sections 86 lie radially inside sections 87 of the second deflection bowl part 46 with respect to the central axis 44 of the air filter 37. The sections 86 and 87 lie against each other and form a step-shaped seal gap, sealing off the section 78 of the mixture channel 18 in the manner of a labyrinth seal. The sections 87 are also represented in FIGS. 14 to 16.

Figure 11:
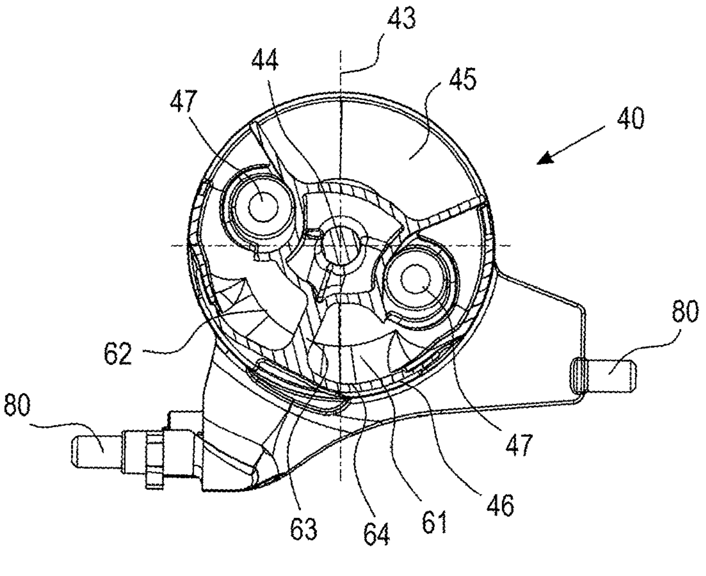

As shown by FIG. 11, the section 78 of the mixture channel 18 in the deflection bowl 40 is divided into two arms 61 and 62, each of which emerges at one of the passage openings 42. On each arm 61, 62 there is arranged a section 86 and a section 87 lying against this. As FIG. 11 also shows, a partition wall 63 runs between the two arms 61 and 62. The partition wall 63 does not run parallel to the central plane 43 of the combustion engine 1, but rather at a slant to this.

In FIG. 12, the central plane 36 of the partition wall 17 is indicated, namely, of the section 49 of the partition wall 17. The position represented for the second deflection bowl part 46 corresponds to the position in the rest position 57. The partition wall 63 makes an angle β with the central plane 36 of the partition wall 17. The angle β is advantageously less than 80°. The two fastening openings 47 are arranged on opposite sides of the central plane 36 of the partition wall 17. The angle β is advantageously inclined such that the partition wall 63 at the circumferential wall 77 runs on the side of the central plane 43 of the combustion engine 1 on which the fastening opening 47 runs above the central plane 36 of the partition wall 17. In the embodiment, the second arm 62 of the mixture channel 18 is arranged on this side of the central plane 43 of the combustion engine 1. The first arm 61 of the mixture channel 18 forms the deflection bowl base 64. This is also represented in FIGS. 14 and 15. Thanks to the inclination of the partition wall 63, the two arms 61 and 62 can easily be configured with comparable flow cross sections.

FIG. 12 indicates schematically by a broken line the position of the connecting opening 50 of the intake channel 16 at the upstream situated end face 33 of the fuel supply unit 20. The connecting opening 28 of the mixture channel 18 to the deflection bowl 40 lies entirely in overlap with the deflection bowl 40, looking in the direction of the intake channel longitudinal axis 29. In the embodiment, the connecting opening 31 of the air channel 19 in the deflection bowl 40 lies completely overlapping with the deflection bowl 40, looking in the direction of the intake channel longitudinal axis 29. As shown by FIG. 12, the second deflection bowl part 46 completely overlaps the entire connecting opening 50 of the intake channel 16 to the deflection bowl 40, looking in the direction of the intake channel longitudinal axis 29 as represented in FIG. 12. The connecting opening 50 lies between the fastening openings 47.

It is understood that the foregoing description is that of the preferred embodiments of the invention and that various changes and modifications may be made thereto without departing from the spirit and scope of the invention as defined in the appended claims.

The invention claimed is:

1. A handheld work apparatus comprising:

a housing;

a work tool;

a combustion engine for driving said work tool arranged in said housing;

said handheld work apparatus defining a rest position wherein said work apparatus stands on a planar, horizontal rest surface;

said handheld work apparatus having a bottom configured to face the planar, horizontal rest surface when in said rest position;

said combustion engine including a cylinder and a piston arranged in said cylinder so as to move in a reciprocating manner therein;

said cylinder and said piston conjointly delimiting a combustion chamber formed in said cylinder;

said combustion engine including a crankcase connected to said cylinder;

said combustion engine including a crankshaft rotatably mounted in said crankcase and being operatively connected to said piston so as to permit said piston to rotatably drive said crankshaft;

said combustion engine including a fuel supply;

an intake channel having an intake channel section formed in said fuel supply;

said fuel supply defining a main-fuel-opening opening into said intake channel section;

said intake channel having a partition wall dividing said intake channel into a mixture channel and an air channel;

said combustion engine including an air filter configured as a round air filter defining a clean chamber;

said combustion engine including a deflection bowl formed in said clean chamber;

said deflection bowl having at least two first passage openings whereat said air channel passes from said deflection bowl into said clean chamber;

said deflection bowl having at least one second passage opening whereat said mixture channel passes out of said deflection bowl into said clean chamber;

said air channel and said mixture channel being guided in said deflection bowl so as to be completely separate from each other;

in said rest position, said at least one second passage opening does not extend into a region situated lower with respect to a geodetic height than said main main-fuel-opening; and, in said rest position, said mixture channel runs at least partly beneath said air channel at least in said fuel supply unit and, wherein said mixture channel is divided, in said deflection bowl, into two arms opening at corresponding ones of the two second passage openings.

2. The handheld work apparatus of claim 1, wherein said fuel supply has an upstream end face; and, in said rest position, said at least one second passage opening does not extend into a region situated lower in terms of said geodetic height than said partition wall in said upstream end face.

3. The handheld work apparatus of claim 1, wherein said cylinder defines a cylinder longitudinal axis; and, said two second passage openings are arranged on respective sides of a central plane containing said cylinder longitudinal axis.

4. The handheld work apparatus of claim 1, wherein said intake channel defines a longitudinal axis; said mixture channel has a connecting opening into said deflection bowl; and, said connecting opening lies entirely in overlapment with said deflection bowl viewed in a direction of said longitudinal axis of said intake channel.

5. The handheld work apparatus of claim 1, wherein said deflection bowl comprises a first deflection bowl part and a second deflection bowl part which adjoin said mixture channel.

6. A handheld work apparatus comprising:

a housing;

a work tool;

a combustion engine for driving said work tool arranged in said housing;

said handheld work apparatus defining a rest position wherein said work apparatus stands on a planar, horizontal rest surface;

said handheld work apparatus having a bottom configured to face the planar, horizontal rest surface when in said rest position;

said combustion engine including a cylinder and a piston arranged in said cylinder so as to move in a reciprocating manner therein;

said cylinder and said piston conjointly delimiting a combustion chamber formed in said cylinder;

said combustion engine comprising a crankcase connected to said cylinder;

said combustion engine comprising a crankshaft rotatably mounted in said crankcase and being operatively connected to said piston so as to permit said piston to rotatably drive said crankshaft;

said combustion engine comprising a fuel supply;

said combustion engine comprising an intake channel having an intake channel section formed in said fuel supply;

said fuel supply comprising a main-fuel-opening opening into said intake channel section;

said intake channel having a partition wall dividing said intake channel into a mixture channel and an air channel;

said combustion engine comprising an air filter configured as a round air filter defining a clean chamber;

said combustion engine comprising a deflection bowl formed in said clean chamber;

said deflection bowl having at least one first passage opening whereat said air channel passes from said deflection bowl into said clean chamber;

said deflection bowl having at least one second passage opening whereat said mixture channel passes out of said deflection bowl into said clean chamber;

said air channel and said mixture channel being guided in said deflection bowl so as to be completely separate from each other;

in said rest position, said at least one second passage opening does not extend into a region situated lower with respect to the geodetic height than said main-fuel-opening; and, in said rest position, said mixture channel runs at least partly beneath said air channel at least in said fuel supply unit;

wherein said deflection bowl comprises a first deflection bowl part and a second deflection bowl part which adjoin said mixture channel; and wherein said deflection bowl has a base and said intake channel defines a longitudinal axis; and, said first deflection bowl part and said second deflection bowl part overlap at least on said base of said deflection bowl and delimit said deflection bowl downwardly at said base in said rest position, in radial direction of said longitudinal axis of said intake channel.

7. The handheld work apparatus of claim 1, wherein said partition wall extends into said deflection bowl.

8. The handheld work apparatus of claim 7, wherein a section of said partition wall is formed on the deflection bowl.

9. A handheld work apparatus comprising:

a housing;

a work tool;

a combustion engine for driving said work tool arranged in said housing;

said handheld work apparatus defining a rest position wherein said work apparatus stands on a planar, horizontal rest surface;

said handheld work apparatus having a bottom configured to face the planar, horizontal rest surface when in said rest position;

said combustion engine including a cylinder and a piston arranged in said cylinder so as to move in a reciprocating manner therein;

said cylinder and said piston conjointly delimiting a combustion chamber formed in said cylinder;

said combustion engine comprising a crankcase connected to said cylinder;

said combustion engine comprising a crankshaft rotatably mounted in said crankcase and being operatively connected to said piston so as to permit said piston to rotatably drive said crankshaft;

said combustion engine comprising a fuel supply;

said combustion engine comprising an intake channel having an intake channel section formed in said fuel supply;

said fuel supply comprising a main-fuel-opening opening into said intake channel section;

said intake channel having a partition wall dividing said intake channel into a mixture channel and an air channel;

said combustion engine comprising an air filter configured as a round air filter defining a clean chamber;

said combustion engine comprising a deflection bowl formed in said clean chamber;

said deflection bowl having at least one first passage opening whereat said air channel passes from said deflection bowl into said clean chamber;

said deflection bowl having at least one second passage opening whereat said mixture channel passes out of said deflection bowl into said clean chamber;

said air channel and said mixture channel being guided in said deflection bowl so as to be completely separate from each other;

in said rest position, said at least one second passage opening does not extend into a region situated lower with respect to the geodetic height than said main-fuel-opening; and, in said rest position, said mixture channel runs at least partly beneath said air channel at least in said fuel supply unit;

wherein said partition wall extends into said deflection bowl;

wherein said partition wall defines a central plane; and, said partition wall adjoins a rear wall of said deflection bowl defining an angle ($\alpha$) lying in a range of 100° to 170° with said central plane of said partition wall.

10. The handheld work apparatus of claim 1, wherein said partition wall defines a central plane; said deflection bowl includes two fastening openings for respective fastening screws; and, said two fastening openings are arranged on opposite sides of said central plane of said partition wall.

11. A handheld work apparatus comprising:

a housing;

a work tool;

a combustion engine for driving said work tool arranged in said housing;

said handheld work apparatus defining a rest position wherein said work apparatus stands on a planar, horizontal rest surface;

said handheld work apparatus having a bottom configured to face the planar, horizontal rest surface when in said rest position;

said combustion engine including a cylinder and a piston arranged in said cylinder so as to move in a reciprocating manner therein;

said cylinder and said piston conjointly delimiting a combustion chamber formed in said cylinder;

said combustion engine comprising a crankcase connected to said cylinder;

said combustion engine comprising a crankshaft rotatably mounted in said crankcase and being operatively connected to said piston so as to permit said piston to rotatably drive said crankshaft;

said combustion engine comprising a fuel supply;

said combustion engine comprising an intake channel having an intake channel section formed in said fuel supply;

said fuel supply comprising a main-fuel-opening opening into said intake channel section;

said intake channel having a partition wall dividing said intake channel into a mixture channel and an air channel;

said combustion engine comprising an air filter configured as a round air filter defining a clean chamber;

said combustion engine comprising a deflection bowl formed in said clean chamber;

said deflection bowl having at least one first passage opening whereat said air channel passes from said deflection bowl into said clean chamber;

said deflection bowl having at least one second passage opening whereat said mixture channel passes out of said deflection bowl into said clean chamber;

said air channel and said mixture channel being guided in said deflection bowl so as to be completely separate from each other;

in said rest position, said at least one second passage opening does not extend into a region situated lower with respect to the geodetic height than said main-fuel-opening; and, in said rest position, said mixture channel runs at least partly beneath said air channel at least in said fuel supply unit;

wherein said partition wall defines a central plane; said deflection bowl includes two fastening openings for respective fastening screws; and, said two fastening openings are arranged on opposite sides of said central plane of said partition wall; and, wherein said mixture channel in said deflection bowl is divided into two arms having a partition wall running therebetween; and, said partition wall between said two arms adjoins said partition wall between said two fastening openings.

12. The handheld work apparatus of claim 11, wherein said partition wall between said two arms is at an angle ($\beta$) of less than 80° with the central plane of said partition wall between said two fastening openings.

13. A handheld work apparatus comprising:

a housing;

a work tool;

a combustion engine for driving said work tool arranged in said housing;

said handheld work apparatus defining a rest position wherein said work apparatus stands on a planar, horizontal rest surface;

said handheld work apparatus having a bottom configured to face the planar, horizontal rest surface when in said rest position;

said combustion engine including a cylinder and a piston arranged in said cylinder so as to move in a reciprocating manner therein;

said cylinder and said piston conjointly delimiting a combustion chamber formed in said cylinder;

said combustion engine comprising a crankcase connected to said cylinder;

said combustion engine comprising a crankshaft rotatably mounted in said crankcase and being operatively connected to said piston so as to permit said piston to rotatably drive said crankshaft;

said combustion engine comprising a fuel supply;

said combustion engine comprising an intake channel having an intake channel section formed in said fuel supply;

said fuel supply comprising a main-fuel-opening opening into said intake channel section;

said intake channel having a partition wall dividing said intake channel into a mixture channel and an air channel;

said combustion engine comprising an air filter configured as a round air filter defining a clean chamber;

said combustion engine comprising a deflection bowl formed in said clean chamber;

said deflection bowl having at least one first passage opening whereat said air channel passes from said deflection bowl into said clean chamber;

said deflection bowl having at least one second passage opening whereat said mixture channel passes out of said deflection bowl into said clean chamber;

said air channel and said mixture channel being guided in said deflection bowl so as to be completely separate from each other;

in said rest position, said at least one second passage opening does not extend into a region situated lower with respect to the geodetic height than said main-fuel-opening; and, in said rest position, said mixture channel runs at least partly beneath said air channel at least in said fuel supply unit;

wherein said partition wall defines a central plane; said deflection bowl includes two fastening openings for respective fastening screws; and, said two fastening openings are arranged on opposite sides of said central plane of said partition wall; and, wherein at least one of said fastening openings is formed on a screw eyelet which is adjoined by a sleeve and at least one section of said sleeve is cut out for the passage of said mixture channel.

14. The handheld work apparatus of claim 1, wherein said crankcase delimits a crankcase interior; said combustion engine is a two-stroke engine having at least one transfer channel connecting said crankcase interior in the region of bottom dead center of said piston fluidically to said combustion chamber; and, said air channel is connected fluidically to said transfer channel for at least a portion of a stroke of said piston.

15. The handheld work apparatus of claim 1, wherein said air filter includes filter material which runs between end-face plates and completely encloses said clean chamber; and, said deflection bowl is surrounded by said filter material of said round filter in said clean chamber.

* * * * *